(12) United States Patent
Zhang et al.

(10) Patent No.: US 8,797,429 B2
(45) Date of Patent: Aug. 5, 2014

(54) CAMERA BLEMISH DEFECTS DETECTION

(71) Applicant: Apple Inc., Cupertino, CA (US)

(72) Inventors: Hongqin Zhang, San Jose, CA (US); Shizhe Shen, San Jose, CA (US); Iain A. McAllister, Campbell, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 13/629,441

(22) Filed: Sep. 27, 2012

(65) Prior Publication Data

US 2013/0229531 A1   Sep. 5, 2013

Related U.S. Application Data

(60) Provisional application No. 61/606,844, filed on Mar. 5, 2012.

(51) Int. Cl.
*H04N 9/64* (2006.01)
*H04N 17/00* (2006.01)

(52) U.S. Cl.
USPC ............................ 348/246; 348/187; 348/247

(58) Field of Classification Search
CPC ..................... H04N 1/00002; H04N 1/00092
See application file for complete search history.

(56) References Cited

U.S. PATENT DOCUMENTS

| 4,639,775 | A | 1/1987 | Cohen et al. |
|---|---|---|---|
| 7,535,501 | B1 | 5/2009 | Loushin et al. |
| 7,965,319 | B2 | 6/2011 | Ozaki |
| 2003/0190087 | A1 | 10/2003 | Kobilansky |
| 2006/0067569 | A1 | 3/2006 | Haga |
| 2008/0050007 | A1* | 2/2008 | Oaki ............................ 382/144 |
| 2009/0303357 | A1* | 12/2009 | Tajima et al. ................. 348/246 |
| 2011/0026823 | A1* | 2/2011 | Wu et al. ....................... 382/167 |
| 2012/0013747 | A1* | 1/2012 | Lyu et al. ...................... 348/187 |

OTHER PUBLICATIONS

"Using Blemish Detect", Imatest—Using Blemish Detect, Internet download: http://www.imatest.com/docs/blemish/, Jan. 9, 2012, (10 pages).
LEPISTö, et al., "Blemish Detection in Camera Production Testing Using Fast Difference Filtering", (pp. 020501-1 through 020501-3).

* cited by examiner

*Primary Examiner* — Lin Ye
*Assistant Examiner* — John H Morehead, III
(74) *Attorney, Agent, or Firm* — Blakely, Sokoloff, Taylor & Zafman LLP

(57) ABSTRACT

A digital image captured by a digital camera module is scaled to a smaller size, and separately horizontal direction filtered and vertical direction filtered using one-dimensional spatial filters. The horizontal direction filtered image and the vertical direction filtered image are combined, wherein edge regions and corner regions of the combined filtered image are created differently than its middle region. The combined filtered image is then thresholded selected pixels of the thresholded image are marked as a blemish region. Other embodiments are also described and claimed.

13 Claims, 4 Drawing Sheets

CAMERA BLEMISH DEFECTS DETECTION

RELATED MATTERS

This application claims the benefit of the earlier filing date of provisional application No. 61/606,844, filed Mar. 5, 2012, entitled "Camera Blemish Defects Detection".

FIELD

An embodiment of the invention is related to techniques for detecting blemish defects in solid state cameras, by image processing of a digital image produced by the solid state camera. Other embodiments are also described.

BACKGROUND

A blemish defect in a camera may be manifested by one or more blurred spots as seen when a resulting digital image produced by the camera is displayed. The blurred spots are due to pixels of the digital image that are different from surrounding ones, even though the camera has taken a picture of a calibration-type flat field target that is completely uniform. Blemish defects are typically caused by scratches, staining, or foreign objects (such as dust particles) and may be present on an optical surface within the optical imaging path of the camera. Blemishes may be contrasted with other defects such as vignettes. The latter are usually minor defects that are present in almost every manufactured specimen, and may be alleviated by post-capture image processing that can correct for vignetting and lens shading defects. Blemishes, on the other hand, may be severe enough so as to result in a particular specimen being flagged as a failed unit, during manufacture or production line testing. Image processing-based blemish detection algorithms are available that can be used to screen out units that have or exhibit blemish defects. A goal of such algorithms is to flag only those units that have blemish defects; efforts to improve the accuracy of such algorithms are ongoing, so as to reduce the likelihood of false positives.

SUMMARY

A digital image captured by a digital camera module is scaled to a smaller size, and separately horizontal direction filtered and vertical direction filtered using one-dimensional spatial filters. The horizontal direction filtered image and the vertical direction filtered image are combined, wherein edge regions and corner regions of the combined filtered image are created differently than its middle region. The combined filtered image is then thresholded and selected pixels of the thresholded image are marked as a blemish region.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

An embodiment of the invention is a process for testing a digital camera module, a consumer electronic device that has a digital camera module integrated therein, or any other component or device having a digital camera, e.g. professional digital video and still cameras. For the sake of convenience, such a component or device is generally referred to here as a "camera module" or device under test (DUT). The process detects anomalous pixel regions within a digital image that has been captured by a solid state imaging sensor of the camera module. It may be expected that one or more embodiments of the invention described here are capable of distinguishing between blemishes and "normal" lens shading or vignetting. The latter is ubiquitous in almost all high volume manufactured specimens of a camera module, and can be easily corrected using post-capture image processing software. The blemish detection process described here may be performed upon a DUT, without the need for a prior lens shading correction or vignetting correction to be completed on the DUT. Moreover, it is believed that the process may be more sensitive to faint blemish defects than other prior techniques. This yields a test technique that may be better able to distinguish normal specimens from bad specimens, thereby improving the yield of a production line by reducing the incidence of false positives.

Figure 1:
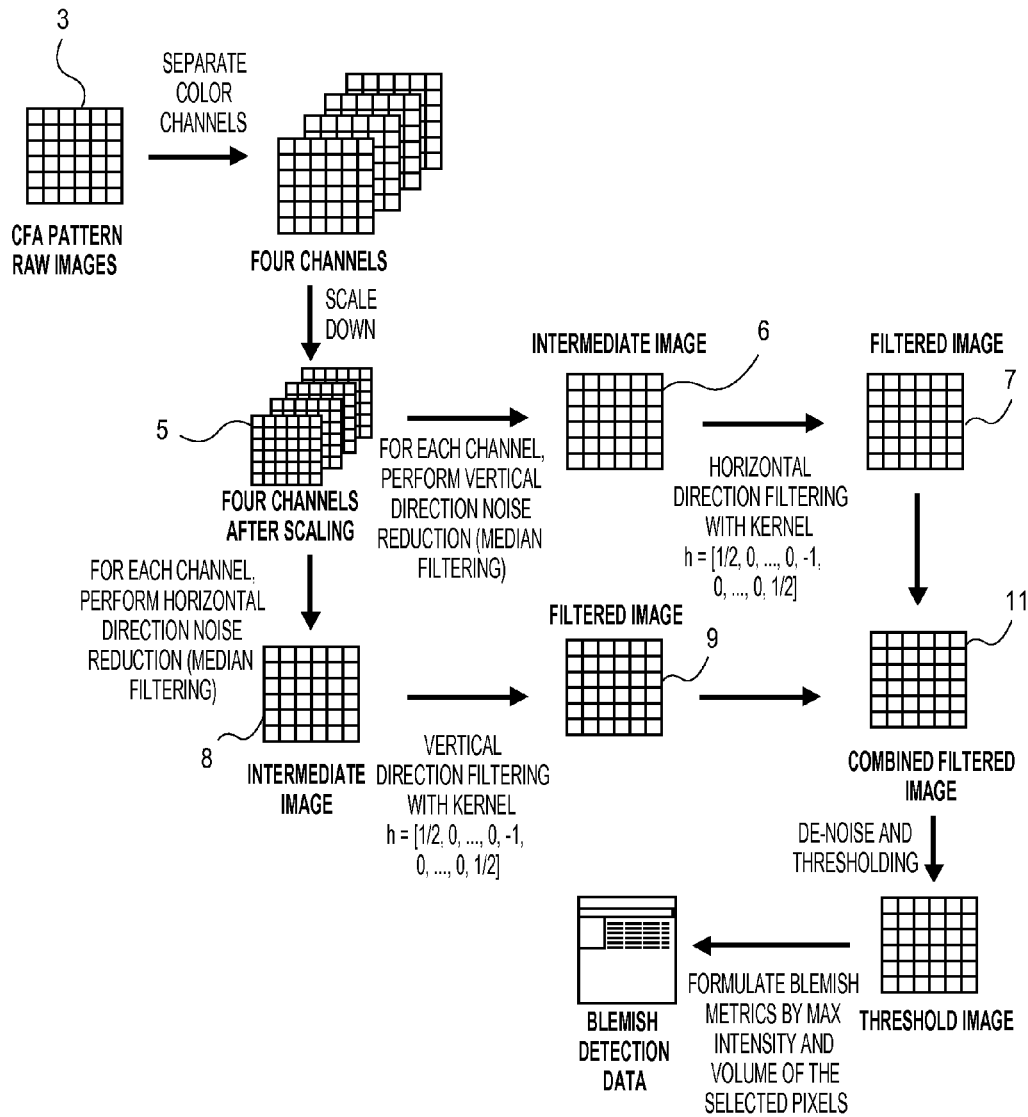
FIG. 1 is a flow diagram of a blemish detection algorithm or test methodology, in accordance with an embodiment of the invention.

Referring to FIG. 1, a flow diagram of a blemish detection algorithm or test methodology is shown, in accordance with an embodiment of the invention. The process may begin with signaling the camera module or DUT to capture an original digital image 3 of a flat-field or uniform color calibration target (not shown) that is suitable for detecting blemishes. The target may be a precisely constructed, entirely flat substrate on which a consistent gray image has been formed and that is brightly and evenly lit. The resulting digital image 3 of such a target is expected to have essentially uniform pixels (the same intensity values) across the entire image. In practice however, a blemish may appear as a cluster of pixels that are somewhat darker or have less intensity than the surrounding areas, and that are considered serious defects whose detection may lead to the rejection of the DUT. Note that blemishes are typically difficult to detect, because their edges are relatively smooth and change slowly across the image, in contrast to impulse-like dead pixels. In one case, the original digital image 3 is a raw image, i.e. it has been minimally processed in that it is not ready for use by a bitmap graphics editor or by a Web browser. The raw image may contain certain artifacts such as noise and vignetting. Vignetting is typically understood as the situation where image intensity falls off radially from a center, leaving in essence a small bright spot (whose edges or corners tend to be darker than the central area). This type of slowly changing image signal may cause difficulties for a blemish detection algorithm, particularly when the edges of a blemish region are similar to those of vignetting.

Referring to FIG. 1, in this particular example, the original image 3 is a color filter array or mosaic (CFA) pattern raw image (e.g., captured by a sensor having a Bayer color filter array or mosaic). One or more constituent color planes may then be separated from the CFA pattern raw image as shown. The following image processing may then be performed on any one of the constituent color planes, in this case four color planes or four color channels, respectively (red, green1, green2 and blue). First, the selected color plane is scaled down to a smaller size (lower resolution) scaled image 5, to obtain some noise reduction and also reduce computation time.

Next, two filtering operations are performed separately, on the same color plane. First, a horizontal direction filtering is performed to result in a horizontal filtered image 7, where a horizontally oriented one-dimensional spatial filter, referred to here as kernel h, is applied to each pixel of the scaled image 5, row-by-row. This may be given by the following equation (for N coefficients):

$$\text{filtered pixel} = \text{pixel} \ast W_1 + \text{pixel} \ast W_2 + \ldots \text{pixel} \ast W_N \quad \text{Eq. [1]}$$

Figure 2:
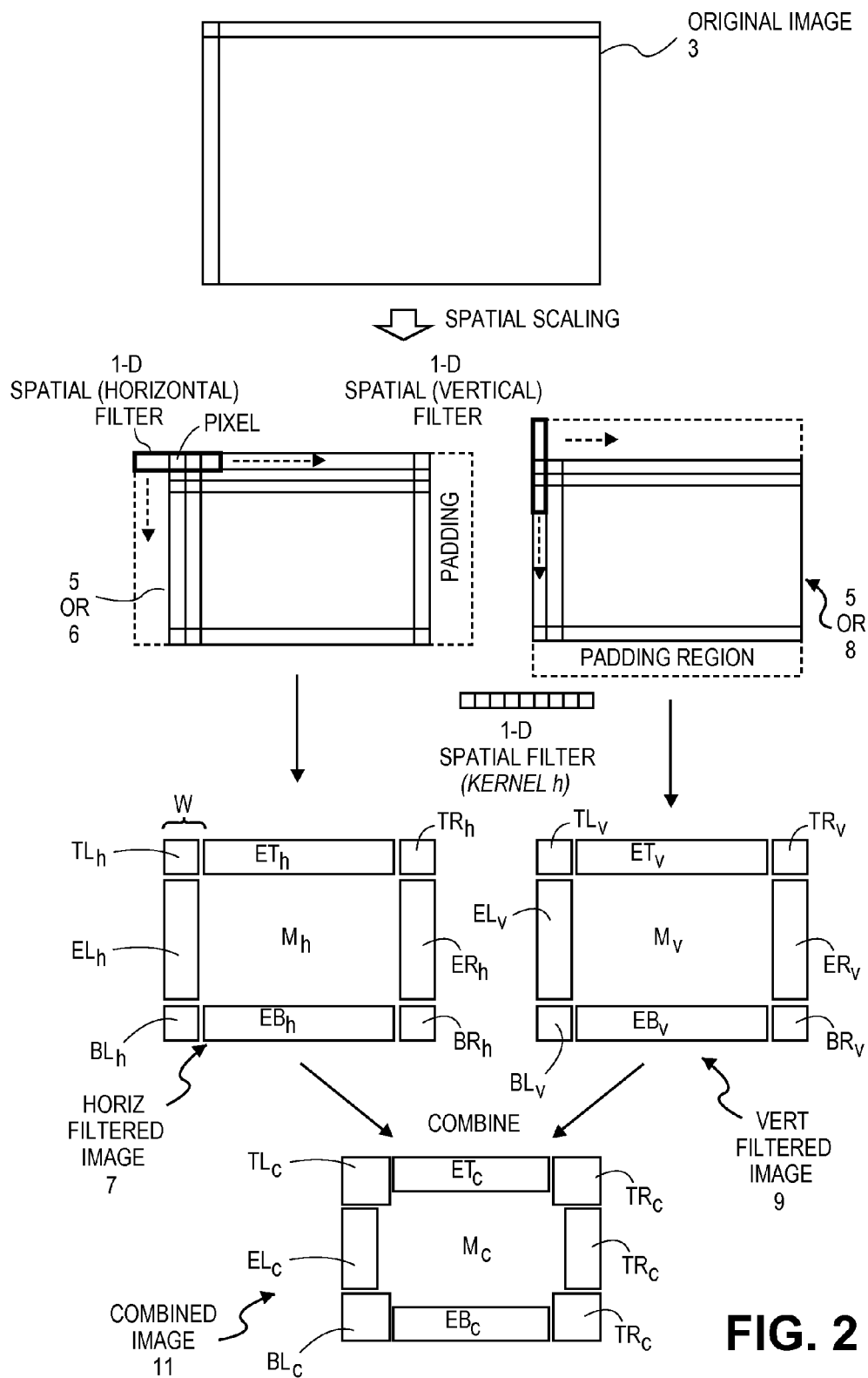
FIG. 2 shows details of the blemish detection methodology.

This is shown in more detail in FIG. 2 where the 1-D spatial filter kernel h may have a width of nine (N=9) coefficients, for instance, (given by the coefficients of [+½, 0, 0, 0, −1, 0, 0, 0, +½]. This is an example of a bandpass filter that can highlight a blemish. The width or size of the kernel h (the number of coefficients) should be selected in advance, in order to match the expected size of any blemishes. This size determination may be made during initial testing of a few DUTs of a particular production run; the size may then be tuned or adapted during the production run depending on the sizes of any blemishes that are found. In particular, the kernel h should be just large enough to encompass the expected blemishes and no larger so that the sensitivity of the overall detection process is not degraded.

In addition to the horizontal direction filtering, a vertical direction filtering operation is also performed on the scaled image 5, to produce a vertical filtered image 9. In one embodiment, the same kernel h that was used for horizontal filtering may be rotated by 90°, to yield a 1-D spatial vertical filter. This is also depicted in FIG. 2, where it can be seen that the vertical filter is applied to each pixel, column-by-column. In both horizontal and vertical filtering, the resulting filtered images 7, 9 are essentially the same size or resolution as the scaled image 5. But note that the two 1-D spatial filters may be of different sizes, and they may also have different coefficients.

FIG. 1 also depicts an optional operation, namely the forming of an intermediate image 6 (which retains the same size as the scaled image 5), prior to applying horizontal direction filtering. This may be performed by passing the scaled image 5 through a vertical direction noise reduction filter. The noise reduction filter may be in accordance with any suitable low pass filtering technique, for instance, filtering based on a measure of central tendency, such as a mean filter or a median filter. Similarly, an intermediate image 8 may be generated, upon which the vertical direction filtering is performed. This may be achieved by passing the scaled image 5 through a horizontal direction noise reduction filter (e.g., a median filter).

Once the horizontal filtered image 7 and the vertical filtered image 9 have been generated (either based directly on the scaled image 5, or alternatively based on the intermediate images 6, 8), the two filtered images 7, 9 are then combined, to create a combined filtered image 11 (which may retain the same size or resolution of each of the images 7, 9). Referring still to FIG. 2, details of the combining operation are shown. In particular, the edge regions (EL, ER, ET, EB) and the corner regions (TL, TR, BL, BR) of the combined filtered image 11 are created differently than its middle or center region M. In particular, the center or middle region $M_c$ may be generated by averaging (or otherwise combining through a suitable linear combination or other statistical measure of) the counterpart middle region $M_h$ of the horizontal filtered image 7, and the middle region $M_v$ of the vertical filtered region 9. In other words, a pixel of $M_c$ may be computed by averaging its counterpart pixels of $M_h$ and $M_v$.

As to the corner regions ($TL_c$, $TR_c$, $BL_c$ and $BR_c$), the pixels in each of these regions may be set equal to their counterpart pixels in the counterpart corner region that has lesser energy (as between the filtered images 7, 9). Thus, for instance, the pixels of the top left corner in the combined image 11, namely $TL_c$, should be set equal to their counterpart pixels of either $TL_h$ or $TL_v$ depending on which of the latter two has lesser energy or lesser total pixel intensity. This is indicated by the following equations:

$$M_c = \text{average}(M_h, M_v)$$

$$TL_c = \min(TL_h, TL_v)$$

$$TR_c = \min(TR_h, TR_v)$$

$$BL_c = \min(BL_h, BL_v)$$

$$BR_c = \min(BR_h, BR_v)$$

$$EL_c = EL_v, ET_c = ET_h$$

$$ER_c = ER_v, EB_c = EB_h \quad \text{Eq. [2]}$$

To determine which of the two corner regions is the lesser, energy of each corner region may be computed by, for example, summing the all of the pixel values in the corner region. Whichever corner region has the lower sum becomes the corresponding corner region of the combined image 11.

For the vertical edge regions $EL_c$, $ER_c$, the pixels in each of these should be set equal to their counterpart edge regions in the vertical filtered image 9. As to the horizontal edge regions $ET_c$ and $EB_c$, the pixels in each of these should be set equal to their counterpart edge regions in the horizontal filtered image 7.

The different treatment of the corner and edge regions, relative to the middle region, may be due to the need for introducing the two extrapolated vertical padding regions to the scaled image 5 (or to the intermediate image 6), when applying the horizontal 1-D spatial filters. The different treatment of the corner and edge regions may also be due to the application of vertical 1-D spatial filtering (which may cause the need to introduce the two extrapolated horizontal padding regions). The four padding regions are shown in FIG. 2 by a rectangle in dashed lines. For instance, a left-edge padding region is needed when applying the horizontal 1-D spatial filter to the pixels in the left most columns of the scaled image 5. Similarly, a right-edge padding region is needed when applying the horizontal 1-D spatial filter to the pixels in the right most columns of the scaled image 5. When applying the vertical 1-D spatial filter to the top most rows of the scaled image, a top-edge padding region is needed, and when applying the vertical 1-D spatial filter to the bottom most rows of the scaled image, a bottom-edge padding region is needed. The width of the left-edge and right-edge padding regions is about one half the width of the horizontal 1-D spatial filter, and the width of the of the top-edge and bottom-edge padding regions is about one half the width of the vertical 1-D spatial filter. The pixels in each of the padding regions should be designed to extend the shading curve that's in their adjacent portions of the scaled image 5, by extrapolation.

Regarding the corner regions of the combined image 11, these may be slightly enlarged, relative to the corner regions of the horizontal and filtered images 7, 9. In particular, the expected corner region within the horizontal or vertical filtered image 7, 9 is a square having a side that is about one-half the width of the one-dimensional spatial filter. Thus, for instance if the filter kernel h is nine elements wide, and is used for both vertical direction and horizontal direction filtering, then the expected corners $TL_h$ and $TL_v$ may each be a square of 5×5 pixels. However, better results may be obtained by defining the counterpart corner $TL_c$ (in the combine image 11) to be slightly larger, e.g. a square of 8×8 pixels. This is depicted in FIG. 2, where it can be seen that the corner region $TL_c$ is slightly wider than its edge regions $ET_c$ and $EL_c$. The pixel values of the enlarged corner region $TL_c$ may be the same as a correspondingly enlarged counterpart corner region of either the horizontal filtered image 7 or the vertical filtered image 9 (depending upon which one has lesser energy).

Referring back to FIG. 1, upon generating the combined filtered image 11, the process may continue with a further de-noising operation, following by a thresholding operation that is designed to result in only the blemish defects remaining. For example, pixels that are greater than a threshold are marked as blemishes. The locations (coordinates) of a group of these blemishes are then recorded as a blemish region, together with the maximum pixel intensity in that region and a sum of all pixels in that region. The latter two metrics are a measure of the severity of the blemish region.

As explained above, an embodiment of the invention may be a machine-readable medium (such as microelectronic memory) having stored thereon instructions, which program one or more data processing components (generically referred to here as a "processor") to perform the DUT configuration and digital image processing operations described above including configuring the exposure setting of a camera module (device under test, DUT) and signaling the DUT to capture an image of a calibration target, and digital image processing such as noise reduction, scaling, filtering, image combining and thresholding of the captured image. In other embodiments, some of these operations might be performed by specific hardware components of a test system, for testing camera modules. The test system may have hardwired logic (e.g., dedicated digital filter blocks, control and timing logic) for certain operations or components. The test system's operations might alternatively be performed by any combination of programmed data processing components and fixed hardwired circuit components.

Figure 3:
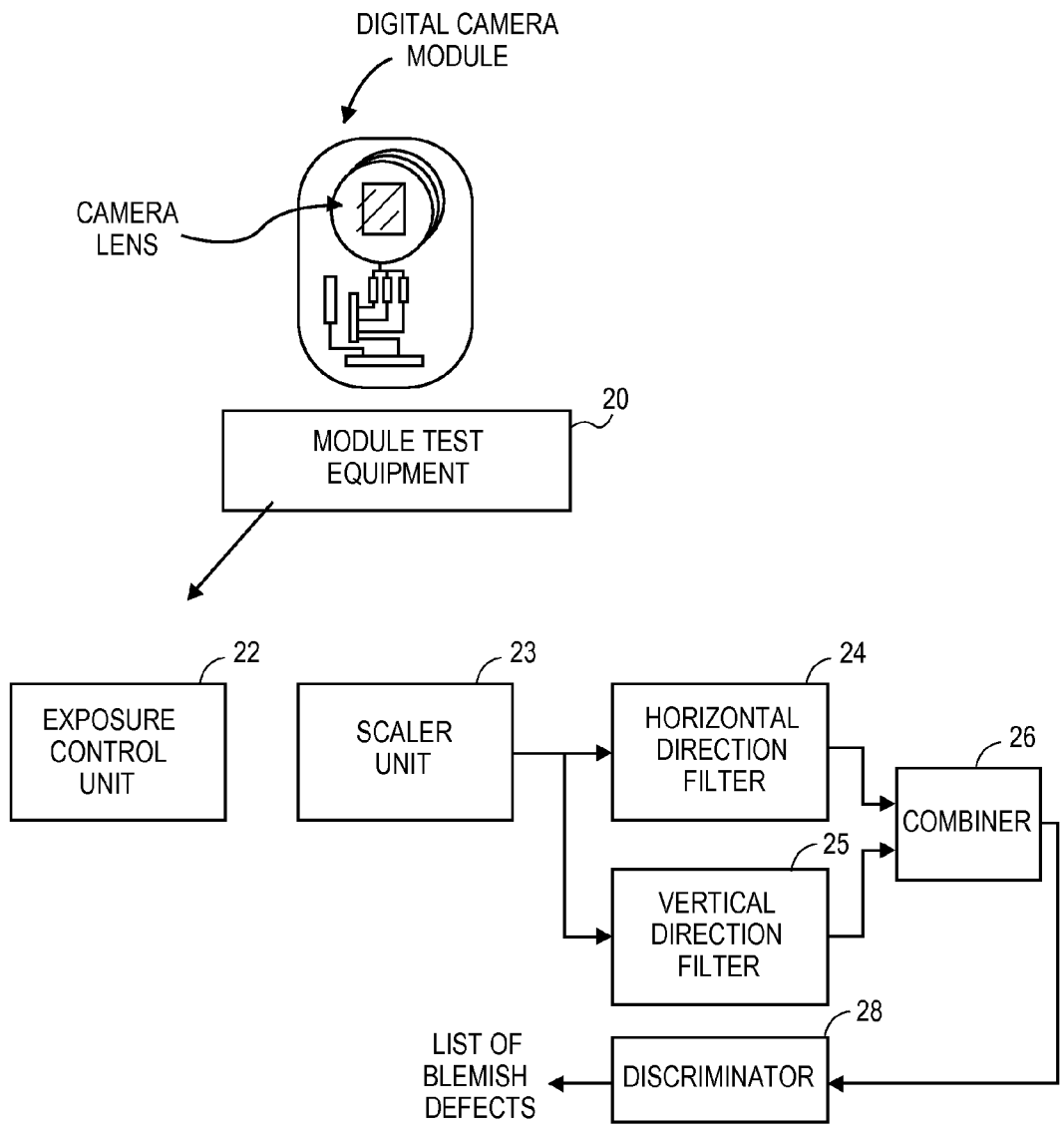
FIG. 3 depicts a device under test being a camera module.
Figure 4:
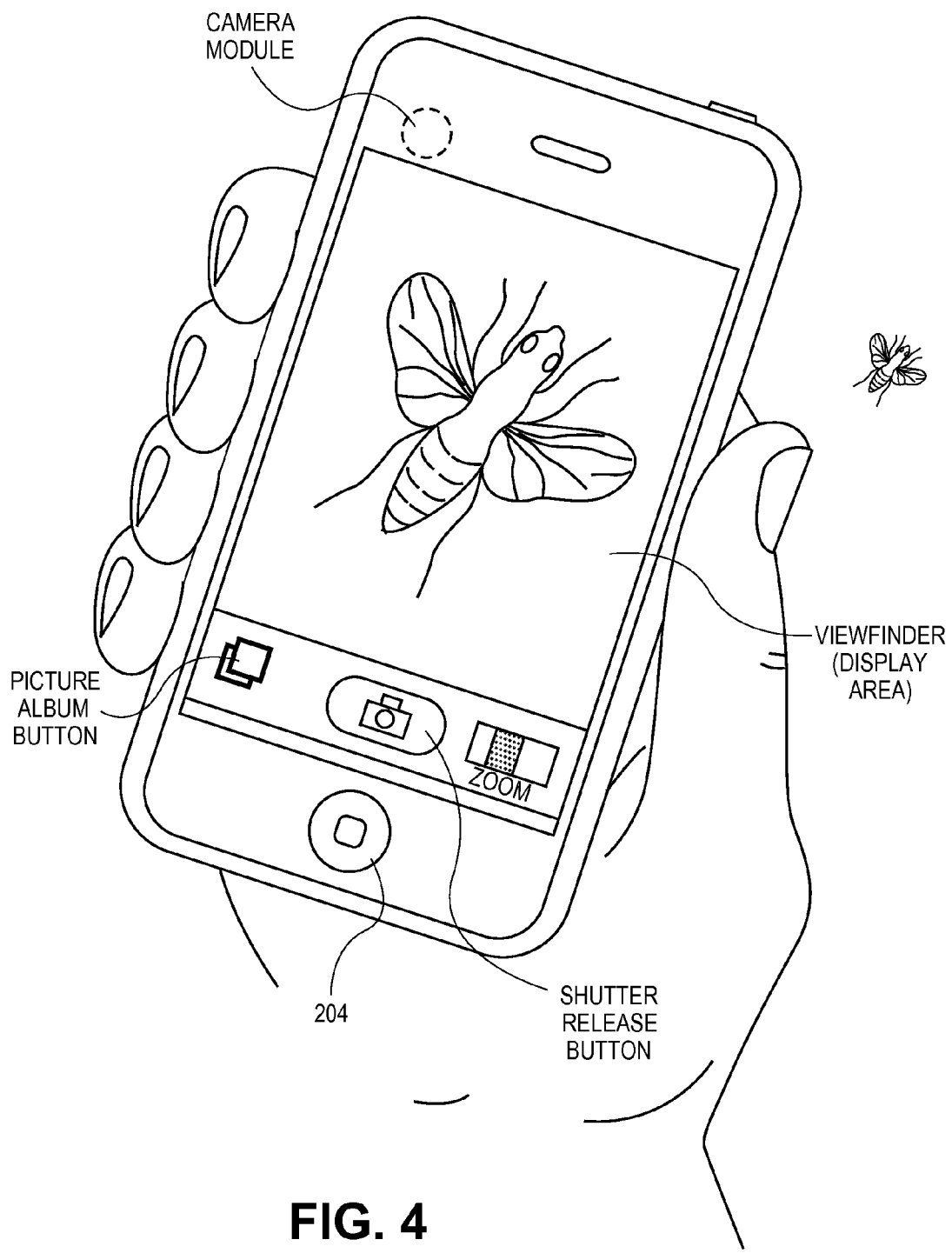
FIG. 4 shows an example consumer electronic device in which the camera module may be integrated.

In one embodiment, a system for testing a camera module may have the following components. Referring now to FIG. 3, this is an example of a test system that may be deployed in a manufacturing test environment, where the DUT is a camera module such as one that can be integrated into a portable consumer electronic device, e.g. a smart phone as depicted in FIG. 4, a tablet computer or a laptop computer. The test system includes module test equipment 20 in which an exposure control unit 22 is to be coupled to a camera module or device under test (DUT), to signal the DUT to capture a digital image. A scaler 23 unit is to be coupled to the camera module, to receive the digital image and spatially scale the digital image to a lower resolution. A horizontal direction filter 24 is provided, through which one instance of the scaled digital image is to pass; its filtering may be similar to the operations described above in FIG. 1 for horizontal direction filtering of the scaled image 5. A vertical direction filter 25 is also provided, through which another instance of the scaled digital image is to pass; its filtering may be similar to the operations described above for vertical direction filtering of the scaled image 5. A combiner 26 serves to combine an output image of the horizontal direction filter 24 with an output image of the vertical direction filter 25, into a combined image having about the same resolution as each of the output images (e.g., similar to the combined image 11 in FIG. 1 and in FIG. 2). A discriminator unit 28 then classifies selected ones of the pixels in the combined image, as a blemish region. The discriminator may perform operations similar to those described above for de-noising and thresholding of the combined filtered image 11, and marking selected pixels of the thresholded image as a blemish region. A list of blemish defects is then generated, which may then be evaluated by either an automatic machine process or "manually" by a human being, to determine whether or not the DUT has passed the blemish defects test (and hence whether or not the DUT should be removed from the list of acceptable manufactured specimens).

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the blemish detection technique has been illustrated by being applied to one or more of the constituent color planes of a Bayer pattern raw image, the blemish detection techniques described here may also work on an original image that is a full color raw image (e.g., having RGB pixels directly produced by a full color imaging sensor that does not have a color filter array or mosaic), a Y-channel image (e.g., derived from a YUV color space image), or a de-mosaiced or full color interpolated version of a color filter mosaic raw image. The latter may also have had some post-processing performed upon it, such as white balance and gamma correction, prior to the application of the blemish detection algorithm. The description is thus to be regarded as illustrative instead of limiting.

What is claimed is:

1. A method for testing a digital camera module, comprising:
    scaling a digital image captured by the digital camera module to a smaller size;
    horizontal direction filtering the scaled image by applying, row by row, a horizontally oriented one-dimensional spatial filter to each pixel of the scaled image;
    vertical direction filtering the scaled image by applying, column by column, a vertically oriented one-dimensional spatial filter to each pixel of the scaled image;
    combining the horizontal direction filtered image and the vertical direction filtered image, wherein edge regions and corner regions of the combined filtered image are created differently than its middle region;
    thresholding the combined filtered image; and marking a selected plurality of pixels of the thresholded image as a blemish region.

2. The method of claim 1 further comprising recording the maximum pixel intensity in the blemish region and a sum of all pixels in the blemish region, in association with coordinates of the blemish region.

3. The method of claim 1 further comprising signaling the digital camera module to capture a digital image of a calibration target.

4. The method of claim 1 wherein the digital image is a color plane of a color filter mosaic raw image.

5. The method of claim 1 further comprising performing noise reduction filtering upon the scaled image prior to the vertical direction filtering and the horizontal direction filtering.

6. A system for testing a camera module, comprising:
a scaler unit to receive a digital image captured by a camera module and spatially scale the digital image to a lower resolution;
a horizontal direction filter through which one instance of the scaled digital image is to pass;
a vertical direction filter through which the scaled digital image is to pass;
a combiner to combine an output image of the horizontal direction filter with an output image of the vertical direction filter, into a combined image having about the same resolution as each of the output images; and
a discriminator unit to classify selected ones of the pixels in the combined image as a blemish region.

7. The system of claim 6 further comprising an exposure control unit that is to be coupled to the camera module, to signal the module to capture the digital image.

8. The system of claim 6 wherein the scaler, horizontal filter, vertical filter, combiner and discriminator are part of a camera module test equipment deployed in a manufacturing testing environment and to which the camera module is coupled as a device under test.

9. The system of claim 7 wherein the scaler, exposure control unit, horizontal filter, vertical filter, combiner and discriminator are part of a camera module test equipment deployed in a manufacturing testing environment and to which the camera module is coupled as a device under test.

10. The system of claim 6 wherein the digital image is a color plane of a color filter mosaic raw image.

11. The system of claim 6 further comprising a noise reduction filter through which each instance of the scaled digital image is to pass before the horizontal and vertical direction filters.

12. A method for testing a digital camera device under test (camera DUT), comprising:
scaling the digital image to a smaller size;
spatially filtering the scaled image by applying a one-dimensional horizontal filter each pixel of the scaled image row by row;
spatially filtering the scaled image by applying a one-dimensional vertical filter to each pixel of the scaled image column by column;
combining the horizontal spatially filtered image and the vertical spatially filtered images, wherein edge regions and corner regions of the combined filtered image are created differently than its middle region; and
thresholding the combined filtered image to reveal a plurality of pixels of the thresholded image as a blemish region.

13. The method of claim 12 further comprising signaling the digital camera DUT to capture said digital image of a calibration target.

* * * * *